(12) United States Patent
Bunker et al.

(10) Patent No.: US 6,314,128 B1
(45) Date of Patent: Nov. 6, 2001

(54) SPREAD SPECTRUM SYNCHRONIZED RECEIVER AND SYNCHRONIZING METHODS

(75) Inventors: Philip A. Bunker, Orem; Stuart Biddulph, Provo; Richard L. Sawyer; Vance D. Campbell, both of Orem; David C. Andrus, Provo, all of UT (US)

(73) Assignee: World Wireless Communications, Inc., Salt Lake City, UT (US)

( * ) Notice: Subject to any disclaimer, the term of this patent is extended or adjusted under 35 U.S.C. 154(b) by 0 days.

(21) Appl. No.: 09/118,447

(22) Filed: Jul. 17, 1998

(51) Int. Cl.[7] .................................................. H04B 1/707
(52) U.S. Cl. ......................... 375/149; 375/147; 375/367
(58) Field of Search ................................... 375/130, 140, 375/141, 147, 149, 367

(56) References Cited

U.S. PATENT DOCUMENTS

| | | |
|---|---|---|
| 5,048,053 | 9/1991 | Mower et al. . |
| 5,121,407 * | 6/1992 | Partyka et al. ...................... 375/130 |
| 5,241,562 * | 8/1993 | Partyka et al. ...................... 375/130 |
| 5,457,713 | 10/1995 | Sanderford, Jr. et al. . |
| 5,477,195 | 12/1995 | Spilker . |
| 5,544,155 | 8/1996 | Lucas et al. . |
| 5,574,754 | 11/1996 | Kurihara et al. . |

* cited by examiner

Primary Examiner—Temesghen Ghebretinsae
(74) Attorney, Agent, or Firm—Hovey, Williams, Timmons & Collins (57) ABSTRACT

Synchronized receiver circuitry and methods are provided for a spread-spectrum communications system which includes a transmitter for generating a data-modulated carrier signal encoded with a predetermined discrete-stepped, cyclical pseudo-random noise code sequence, and a receiver for despreading and demodulating the encoded spread-spectrum modulated carrier signal. The receiver has a pseudo-random noise code generator, a mixer connected to the pseudo-random noise code generator for mixing the encoded spread-spectrum modulated carrier signal with the code sequence provided by the pseudo/random noise code generator to despread the carrier signal, and an indicator in the receiver for generating a received signal strength indicator analog signal. The synchronized receiver includes a clock which provides a frequency output corresponding to the frequency of the clock driving the pseudo-random noise code generator in the transmitter. The synchronized receiver also has an analog-to-digital converter for converting the analog signal to a digital signal indicative of the best correlation between the frequency and PN phase of the transmitted modulated carrier signal and the received modulated carrier signal. The synchronized receiver also includes decoding circuitry connected to the clock and the analog-to-digital converter for sampling the analog signal received at each of a plurality of discrete steps in the PN code, and code chips for determining the peak step when the sampled signal reaches its maximum strength during the code sequence and chip partial period, and for aligning the receiver code sequence with the transmitted code sequence.

12 Claims, 5 Drawing Sheets

SPREAD SPECTRUM SYNCHRONIZED RECEIVER AND SYNCHRONIZING METHODS

BACKGROUND OF THE INVENTION

1. Field of the Invention

The present invention relates to a synchronized receiver for a spread spectrum communications system, and more particularly to a system for synchronizing the pseudo noise code transmissions between receiver and transmitter in a spread spectrum system.

2. Description of the Related Art

Spread Spectrum wireless systems transmit signals over a bandwidth that is much greater than required for standard narrow band transmission. The purpose of this approach is to minimize noise interference, reduce the likelihood of narrow band interference and multi-path effects, and provide security against unauthorized eavesdroppers. In the past, the use of spread spectrum techniques were limited mostly to military applications. However, spread spectrum systems are now becoming dominant in the areas of satellite communications, point-to-point connections, wireless local loop communications, wireless local area networks and digital cellular communications.

The two most common types of spectrum spreading are frequency hopping and direct sequence techniques. Both approaches utilize a pseudo-random noise (PN) code generator in the transmitter to spread the RF carrier signal over a wide bandwidth. A code generator in the receiver having the identical PN code "despreads" the signal to recover the data stream. These techniques offer the advantage of having multiple simultaneous communication links on the same frequencies by assigning them different spreading codes. Each transmitted signal looks like noise but can be decoded by a receiver with the same PN code to regenerate the original data stream.

The frequency hopping (FH) spread spectrum process causes the carrier signal to "hop" from one frequency to another using a hop table. The receiver hops over the same hop table as the transmitter and then demodulates the carrier to receive the data.

The direct sequence (DS) spread spectrum technique, which may be used for code division multiple access (CDMA), encodes the binary or analog data itself into a high-speed PN code. This is done by mixing the data with a much faster sequence of PN code bits, wherein each bit of data is converted into a number of sub-bits, called "chips." This coded data signal is then mixed with the RF carrier signal to effectively spread the main lobe of the carrier over a bandwidth spectrum equal to twice the clock rate of the chipping code. Direct Sequence transmission changes the nature of a transmitter station from predominately analog processing to mostly digital. Analog devices are still generally used for modulating and demodulating carrier signals with the data stream. However, the pseudo-random techniques which spread the signal frequency by code-modulating the transmitted signal are applied and removed in the digital domain. Using DS, the conventional communication waveform is multiplied by a PN binary sequence in the transmitter. Hence, the amount that the signal is spread is determined by the chipping rate. In the receiver, the same PN code is mixed with the received signal to despread the information and recover the original modulated narrow band signal.

In all spread spectrum systems it is essential that the receiver apply the same PN code synchronized in the same phase as the PN code emanating from the transmitter, in order to decipher the data stream. The synchronization occurs in two steps: acquisition and tracking. In acquisition, a coarse estimate of the timing offset is produced by a correlation device. Then this estimate is refined to the point where reliable data demodulation can occur by a tracking device, such as a phase lock loop (PLL). The PLL holds the receiver PN sequence in the proper phase with the transmitter PN sequence to collapse the spread signal back to the original narrow bandwidth centered at the modulated carrier frequency.

Various synchronizing techniques have been developed for synchronizing a code generator in a receiver with the code sent by a corresponding transmitter. In one synchronizing process called "carrier lock tracking," the receiver has a sliding correlator which phase aligns its locally generated code sequence with the transmitted code sequence to find a "carrier lock." A carrier detection/frequency division process is then used to maintain the lock. One disadvantage to this approach is that the clock frequency for the receiver code generator is required be a sub-multiple of the carrier frequency, resulting in undesirable design constraints.

In U.S. Pat. No. 5,101,417 (Richley et al.) a variation of carrier lock tracking is disclosed in which a local clocking generator provides a nominal frequency which is offset from the transmitted code frequency. Therefore, the code sequence of the receiver "slides" into phase correlation with the code sequence of the transmitted signal. A phase controller regulates the rate at which its resident code generator is clocked, once phase correlation has been achieved. After initial correlation, a lock detection circuit determines when the coded sequence of the receiver begins to slide out of phase with the transmitted code and generates an error signal which triggers the phase shift circuit to increase or decrease the clock frequency until the code sequences are aligned.

This approach has the disadvantage that the locally generated code sequence tends to slide out of phase alignment with the transmitted code sequence and must be almost continually re-aligned by a triggering circuit which phase shifts the clock pulses of the locally generated code sequence. Thus the frequency of the local code sequence is essentially continuously variable, similar to a VCO in a traditional phase-locked loop system. This process requires a constant error signal to maintain alignment of the receiver and transmitter code generators.

Moreover, prior art receivers for spread spectrum systems, such as the Richley system, generate a digital feedback error signal after the signal has been demodulated, resulting in some delay in feedback and a certain amount of power loss.

Some prior art communication systems provided an analog signal from the receiver modulator to an analog peak detector that sent an analog error signal to be processed by a locking circuit. However, the analog signal from the detector tended to be unstable and required substantial temperature stability and very limited component variables.

Accordingly, it is apparent that there is a need for a method and system for synchronizing spread spectrum communications systems which processes an analog peak signal generated directly by a spread spectrum receiver without encountering the instability of prior art systems. Moreover, there is a need for a method and system which will achieve phase lock of the code sequences without requiring that the receiver clock frequency be a sub-multiple of the carrier frequency and without needing a constant error signal to maintain alignment.

SUMMARY OF THE INVENTION

The present invention provides a spread spectrum communications system having synchronization means that detects an analog peak signal directly from the receiver and digitally processes the signal to provide the necessary acquisition and tracking functions. The system of the present invention senses the decrease of an analog peak signal by constant phase stepping of the reference sequence to maintain zero phase differential. Therefore, the system can maintain lock with less than ⅛ chip error in frequency between the transmitter and the receiver. The present invention does not shift the frequency of the clock driving the sequence generator, but instead delays or advances the starting of the sequence in discrete increments of the clock.

The system of the present invention provides for PN alignment and tracking by using an IF received signal strength indicator (RSSI) signal provided by a conventional narrow band receiver to detect when the receiver PN code is aligned with the transmitter code. The RSSI signal is also used to track the transmit code by stepwise advancing and retarding the receive code in sub-chip increments to maintain maximum correlation.

The present invention may use analog technology for the phase acquisition and tracking functions, which uses less power and is less expensive than the digital approach of the prior art. Moreover, the present invention processes the received signal before demodulation so that faster acquisition and tracking are enabled. In addition, the system of the present invention does not require that the clock of the receiver have a different frequency than that of the transmitter, in order to align the signals, as in the prior art. Accordingly, the system of the present invention is ideal for a variety of wireless telecommunication systems, particularly analog low-power spread-spectrum radio systems.

In one preferred embodiment of the present invention, synchronized circuitry and a method are provided for a spread-spectrum communications system which includes a transmitter for generating a data-modulated carrier signal encoded with a predetermined discrete-stepped, cyclical pseudo-random noise code sequence, and a receiver for demodulating and despreading the encoded spread-spectrum modulated carrier signal. The receiver has a pseudo-random noise code generator, a mixer connected to the pseudo-random noise code generator for mixing the encoded spread-spectrum modulated carrier signal from the transmitter with the code sequence provided by the receiver's pseudo\random noise code generator to despread the carrier signal, and an IF amplifier for generating a received signal strength indicator analog signal.

The synchronized receiver includes a clock which provides a frequency output roughly corresponding to the frequency of the clock driving the pseudo-random noise code generator in the transmitter. The clock period is divided into discrete sub-periods that are used for tracking, as will be discussed in detail later. The synchronized receiver also has an analog-to-digital converter for converting the analog RSSI signal to a digital signal indicative of the amount of correlation between the phase of the transmitted PN modulated carrier signal and the receiver PN modulated signal. The synchronized receiver contains circuitry for adjusting sequence alignment between transmitter and receiver according to the analog RSSI signal before demodulation.

In another preferred embodiment of the present invention a receiver circuitry and method are provided for a spread-spectrum communications system having a transmitter generating a modulated carrier signal encoded with a cyclical pseudo-random code sequence. The receiver comprises a conventional non-spread receiver for receiving and demodulating radio frequency modulated carrier signals having an intermediate frequency amplifier which generates an analog output signal corresponding to the signal strength in the intermediate frequency amplifier or other means of detecting signal amplitude. A pseudo-random code generator having the same cyclical pseudo-random code as that of the transmitter, and a mixer for combining the transmitted encoded modulated carrier signal with the pseudo-random code from the receiver code generator are added to provide a dispread modulated carrier signal to the otherwise conventional receiver. The receiver further includes a locking circuit connected between the intermediate frequency amplifier and the pseudo-random code generator for shifting the phase of the pseudo-random code from the receiver code generator to align with the pseudo-random code in the transmitted signal in response to the output signal from the amplifier.

BRIEF DESCRIPTION OF THE DRAWINGS

Additional features and advantages of this invention will become apparent when the following detailed description is read in conjunction with the attached drawings, in which.

DESCRIPTION OF THE PREFERRED EMBODIMENTS

Figure 1:
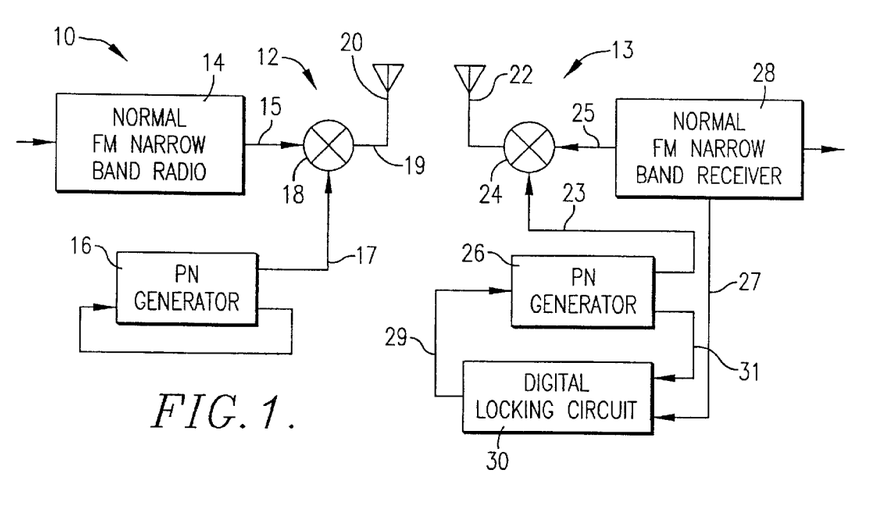
FIG. 1 is a simplified block diagram of a spread spectrum communication system embodying the present invention.

FIG. 1 shows a spread spectrum communication system 10 according to a preferred embodiment of the present invention. The system shown in FIG. 1 has a conventional spread spectrum transmitter 12 and a spread spectrum receiver 13. Transmitter 12 includes a frequency-modulated, narrow-band radio transmitter 14 emitting a frequency-modulated carrier frequency 15, a pseudo-random noise generator 16 having a coded sequence output signal 17 and a modulating mixer 18 combining the modulated carrier frequency 15 and the PN code signal 17 to transmit a spread spectrum signal 19 on transmitting antenna 20.

Signal 19 is received on receiver antenna 22 and is de-spread at mixer 24 by being combined with a PN coded signal 23, corresponding to PN coded signal 17, which is emitted from PN code generator 26. The narrow band modulated signal 25 flows from mixer 24 to a conventional frequency-modulated, narrow-band receiver 28 for frequency demodulation.

The above described system is a conventional spread spectrum system utilizing conventional components that require no further description.

Connected between receiver 28 and PN code generator 26 is a digital locking circuit 30 which is unique to the present invention. A peak analog signal 27 is transmitted from receiver 28 to digital locking circuit 30 to indicate when the modulated signal 25 is at a maximum. A locking signal 29 is directed from locking circuit 30 to PN code generator 26 to control the phase shift of the coded signal 23. Code Generator 26 provides a feedback signal 31 to digital locking circuit 30 to maintain the phase lock during transmission of the data stream.

Figure 2:
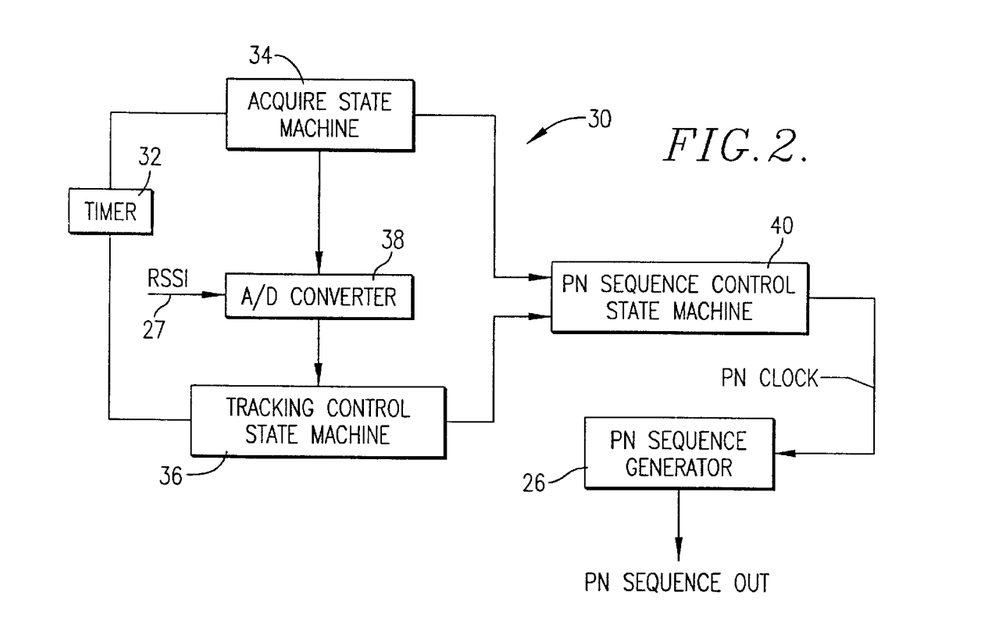
FIG. 2 is a simplified functional block diagram of the digital locking circuit of the receiver in a spread spectrum communication system shown in FIG. 1.

Turning now to FIG. 2, the digital locking circuit 30 is shown in greater detail. Preferably, locking circuit 30 is embodied on a micro device microchip PIC processor or an application specific integrated circuit (ASIC), so the functional equivalents are shown in the form of "state machines," it being understood that the layout of such state machines are well known within the art.

A conventional timing circuit 32 includes a timer which feeds timing pulses 42 to an acquire state machine 34 and a tracking control state machine 36. A clock control generator feeds control pulses to state machines 34 and 36 and to an analog/digital converter 38. A reset input provides reset pulses to state machines 34 and 36. Converter 38 receives the peak signal 27 from receiver 28 in the form of an analog signal called the received signal strength indicator(RSSI). The RSSI signal is at its maximum when the received PN code is aligned with the transmitted PN code. The same RSSI signal is further used to track the transmit code by stepwise advancing and retarding the receive code, to maintain maximum correlation as will be described in detail below. The outputs of both the acquire state machine 34 and the tracking control state machine 36 are directed to a PN sequence control state machine 40 which, together with a select input 29, controls the operation of the PN sequence generator 26.

A peak RSSI signal is generated when each of two events occur. The first event is when the receiver is tuned to the same frequency as the transmitter, centered within the band of spread energy. The second event is when the PN codes are in alignment. The RSSI signal is determined from the receiver by measuring IF amplifier current. When the carrier signal in the IF amplifier is at its maximum, the power supply current to the amplifier is at its maximum. This is the normal practice for obtaining an RSSI signal in a radio receiver.

It should be noted that normal tuning of the carrier in the receiver is carried out by conventional means. Contrary to some prior art no other frequency control is needed. The clock running the PN code generator of the receiver does not vary in frequency but the clock period is divided into discrete periods which are then used to shift the PN sequence in time.

In the preferred embodiment of the invention shown herein, the PN coded sequence is 127 bits long (127 chips) and repeats for each sequence. The chip period is eight microseconds long. Thus, a clock of one MHZ is divided by two to provide a period of two microseconds, then divided by two again to provide the chip period of four microseconds and then divided by two again to provide a chip period of eight microseconds. The period of eight microseconds drives the register which provides the PN code, and the period of two microseconds drives a ⅛ chip advance or ⅛ chip retard, resulting in certain phases being swallowed for advance or added for delay, as will be discussed in detail below.

Referring now to FIGS. 3A–D, flow diagrams are provided explaining the operation of the digital locking circuit 30 shown in FIG. 2. First, a short overview will be given. During the acquisition phase, the reference (receiver) sequence is discretely shifted by whole chip lengths. After each shift in the sequence, the sequence is allowed to run unchanged for a period of time equal to all or a fraction of the period of the entire sequence. An A/D sample of the RSSI signal is taken. The reference sequence continues to be time-shifted and RSSI samples continue to be taken until the sequence has been shifted to its original phase relative to the transmitter code. This maximum value corresponds to the time-shifted sequence that is the most closely aligned with the transmitter code. The reference sequence is then shifted until it returns to the time-shifted sequence corresponding to the previously found RSSI peak. An RSSI sample is then taken, and if it is found to be at or very close to the previous peak, the tracking routine begins.

During the acquisition phase, the sequence is clocked using partial steps of the normal PN generator clock. The start-up lock sequence causes the reference sequence to slide by all of the possible phase relationships while sampling the RSSI peaks. After scanning is completed, the peak RSSI value and process returns to the corresponding time shifted clock. This is the event which begins the tracking sequence. The searching sequence is re-entered if the lock is lost during the tracking sequence. A lost lock is detected when the local maximum value is not detectable.

During the tracking phase, as the sequence is shifted back and forth across the zero phase boundary, the RSSI signal exhibits a local maximum function. On either side of this local maximum, the system detects a 2.5 dB drop in signal strength. This drop is not a total absence of signal but is a substantially diminished signal which may be very close to a zero value. The system detects these dips on either side of the local maximum value and uses them to dither between, in order to maintain a lock. During the lock phase, the sequence is clocked using the ANDing sum of several faster clocks.

In order to time shift the clock edge used to generate the code sequence, a different Boolean combination representing a leading or lagging edge from the one being currently used is selected. This technique has the effect of moving the clock driving the reference (receiver) sequence in phase with respect to the incoming (transmitter) sequence. Each time the sequence is shifted in time, the correlation function is performed by comparing the currently sampled RSSI signal with the stored RSSI maximum.

Accordingly, the locking approach of the present invention seeks for the maximum signal strength from the receiver by phase shifting the receive PN sequence on either side of the maximum signal, much as one would tune a radio by hand. Once the maximum strength is obtained the present system continues to phase shift back and forth around the peak signal to maintain a firm lock within the shifting dither. Thus, contrary to the prior art, the system of the present invention uses the RSSI signal prior to demodulation to advance or retard the receiver PN sequence by fractional chips without changing the receiver clock frequency. The present system also avoids modulating the length of the code sequence, as is done in some of the prior art, thereby providing greater accuracy in despreading.

Figure 3A:
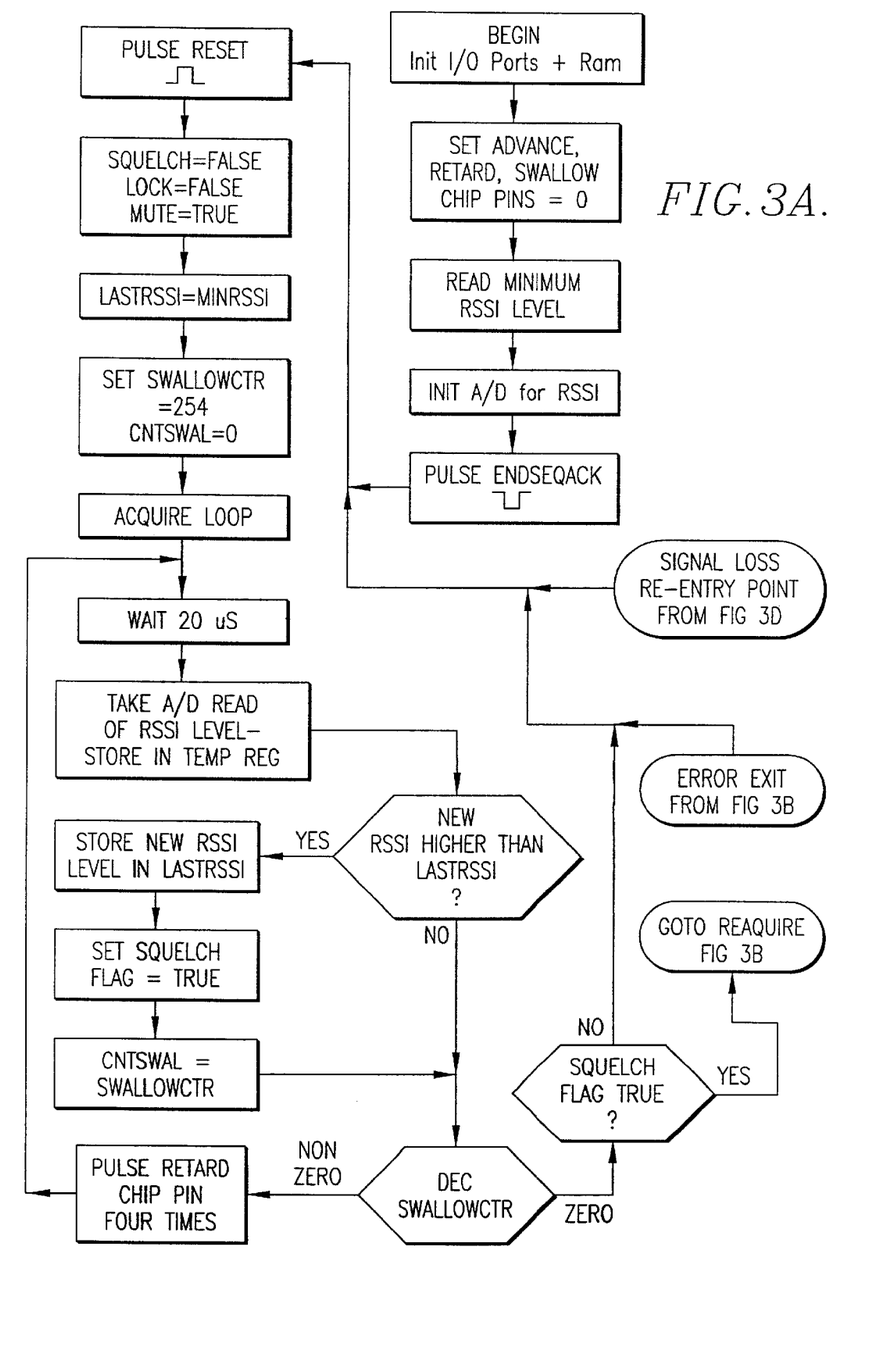
FIGS. 3A, 3B, 3C, and 3D are flow diagrams showing the logic process of the digital locking circuit shown in FIG. 2.
Figure 3B:
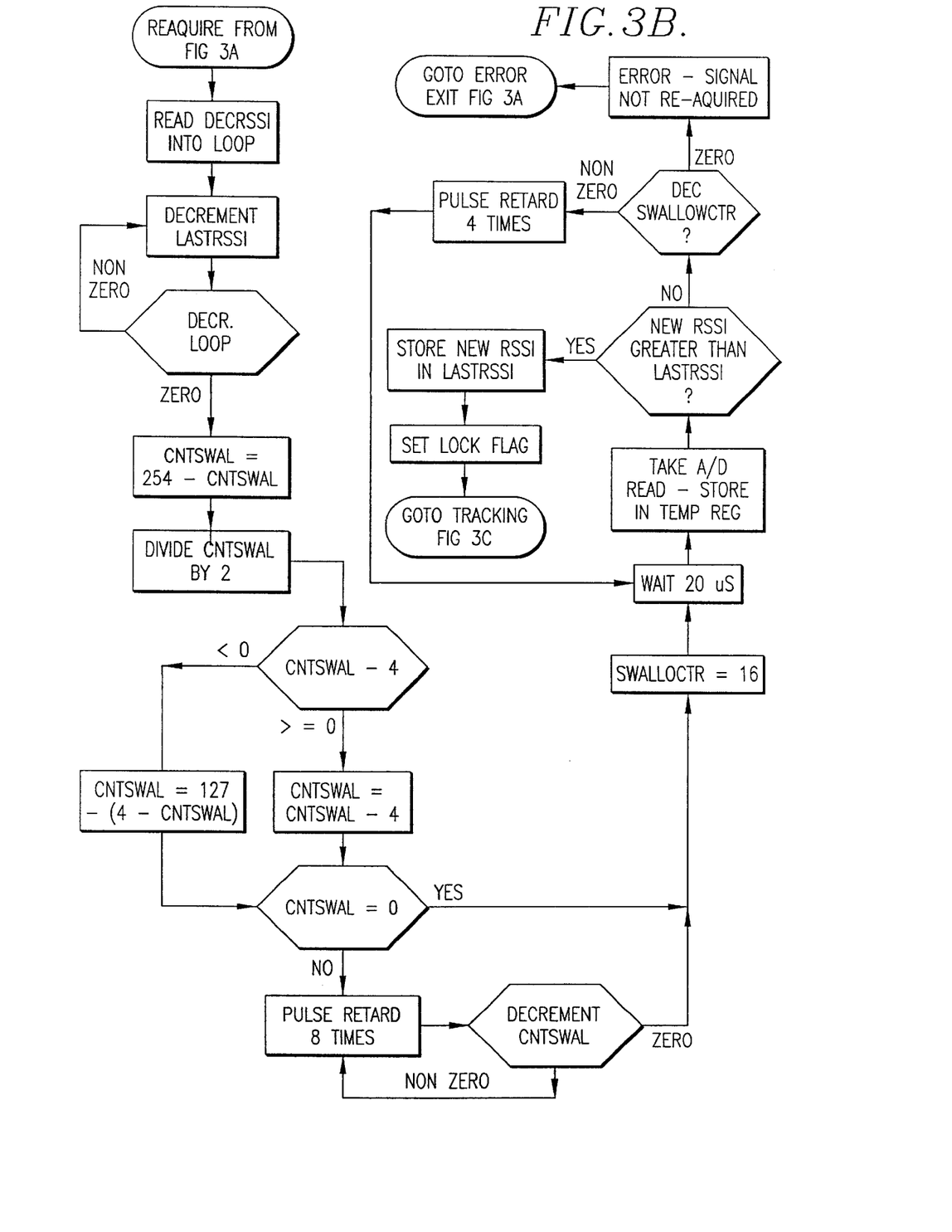
Figure 3C:
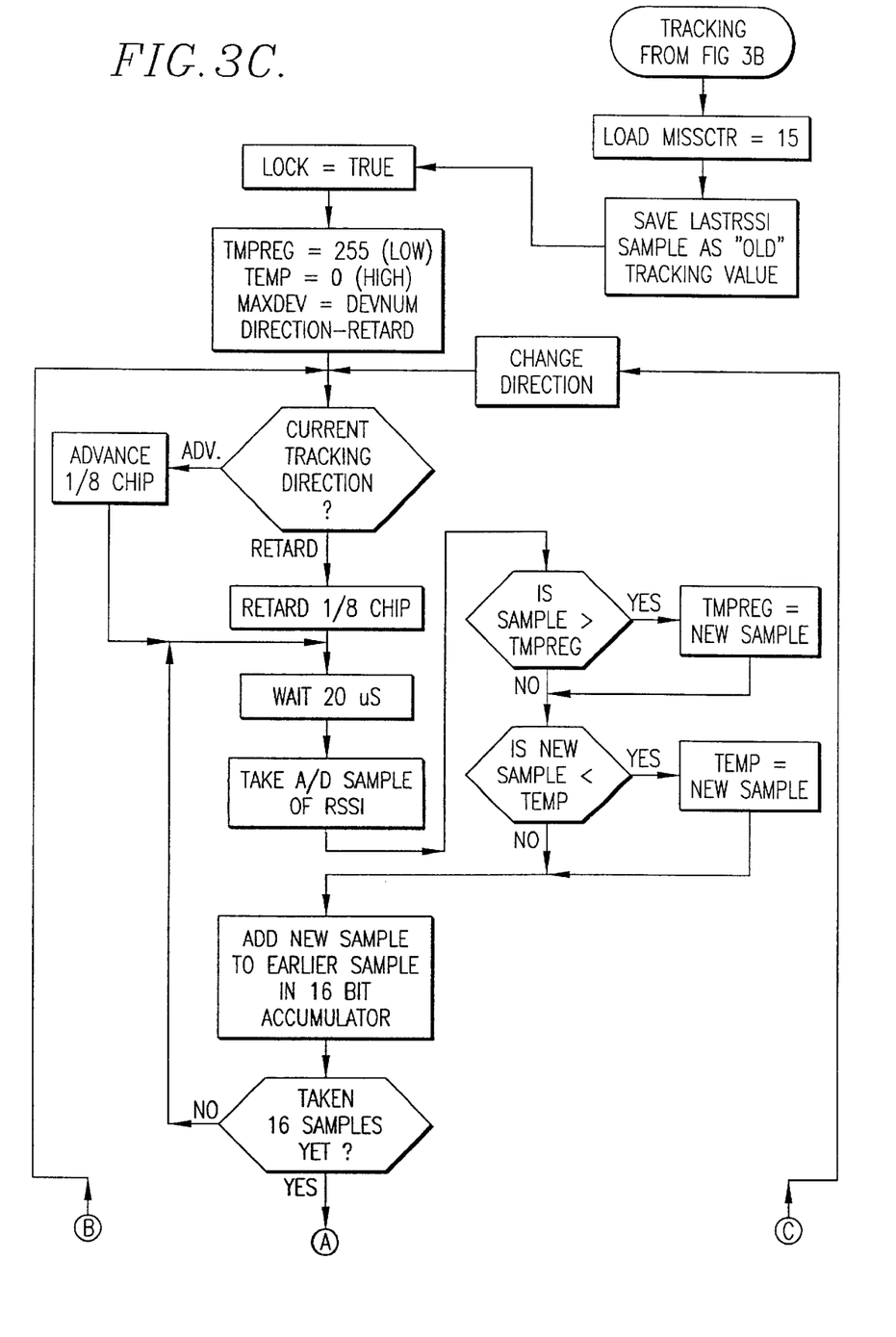
Figure 3D:
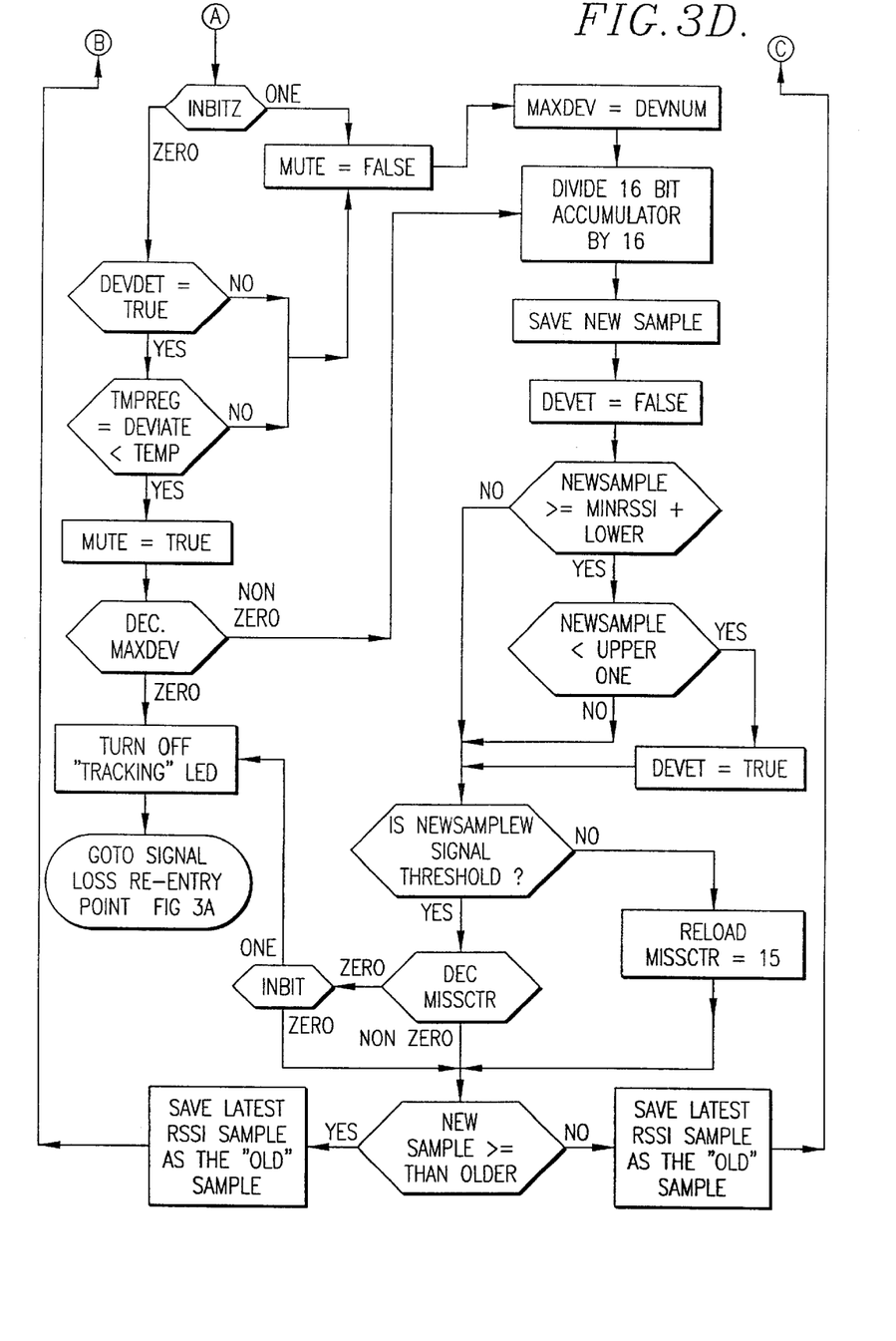

Looking now at the flow diagrams of FIGS. *3a–c*, the locking process of the present system is shown in greater detail. Although the following description does not refer to reference characters in the flow diagrams, the process described herein can be readily understood by one skilled in the art by reference to FIGS. *3a–c*. In this particular embodiment of the present invention, the locking circuit has been embodied on an application specific integrated circuit (ASIC). The code bit rate is 127, that is there are 127 specific steps in the code sequence, each of which is termed a chip. The ASIC generates PN sequences for both the transmit and receive sections of the communications system. The ASIC uses the analog RSSI signal as an indicator of how well the generated PN sequence correlates with the received PN sequence. Lock is maintained by fractionally shifting the receive sequence to obtain the maximum RSSI level.

Referring briefly to FIG. 2, the main portions of the ASIC are the acquire state machine 34, the tracking state machine 36, PN sequence generators 26 and 40, an A/D converter 38 and support circuitry. In the following discussion, references will be made to various gates of the ASIC for the functions mentioned.

The circuit is held in reset by an active low signal on the gate called "nreset." On the rising edge of this signal, the input parameters DecRSSI, Sel and MinRSSI are latched internally, and the system begins operation on the next rising edge of the clock. The PN sequence acquisition is controlled by acquire state machine 34 in "acquire.vhd" as described above. State machine 34 slides the receiver PN clock one half chip at a time through all 127 chips in the PN sequence by asserting a "swallow" signal to cause the PN shift register to ignore its clock for a short time. After each such swallow, the circuit waits for a short period of time determined by the dwell select inputs, for the RSSI voltage to stabilize. RSSI is then measured with the A/D converter 38. If a given RSSI signal is the greatest value recorded so far, a counter is reset to approximate where the maximum RSSI value was found. The maximum RSSI voltage is recorded. This information is used in the "fast jump to lock" feature described below.

Once the acquire state machine 34 has cycled through all 127 chips, in reality through 254 half chips, it issues swallow signals while the fast jump to lock counter counts down. This action has the effect of sliding the PN sequence rapidly to get close to where the maximum RSSI signal occurs. At this point, the acquire state machine 34 tries to re-acquire the PN sequence by swallowing half chips and looking for an RSSI reading within "DecRSSI" of the peak RSSI signal. When this peak is found again, the acquire state machine 34 asserts its lock output and spins waiting for either a reset or signal loss indication from the tracking state machine 36. If the maximum value of RSSI is less than the previously latched "MinRSSI" parameter, the state machine 34 resets itself and starts the acquire process over again.

Once the lock signal is received, the tracking state machine 36 begins running. The tracking state machine 36 maintains lock by dithering the sequence forward or backward using the "advance" or "retard" signals, respectively. The tracking state machine 36 waits for the time duration specified by the dwell select inputs and samples the RSSI signal. After taking an average over 16 samples, the tracking state machine 36 compares the new average with the previous average, and if it is less, toggles the dithering direction from forward to backward or from backward to forward, respectively. If the "reacquire" input is active high, the tracking state machine 36 will also check the average RSSI signal against the "MinRSSI" parameter and will issue a signal loss indicator back to the acquire state machine 34 if the average falls below this value. This signal assertion causes the acquire state machine 34 to reset itself and start the entire process over again.

The PN sequences are generated by linear feedback shift registers in a file called "pnseq.vhd" for both the transmit and receive PN sequences. The feedback taps are generated in the "seqnum.vhd" file from the "se10" and "se11" inputs. Two select lines allow for four possible PN sequences.

The shift register clocks are generated in the files "clkdivid.vhd" and "states.vhd" for the transmit and receive sections, respectively. The transmit clock is derived from a counter by ⅛ the input clock frequency. The receiver shift register clock is derived from a state machine in "states.vhd" to allow the swallow, retard and advance inputs to shift the sequence stepwise. The retard input causes the state machine to remain in the same state, thereby lengthening the PN register clock period by ⅛. The advance input shortens the clock period by ⅛. The swallow input simply engages another small state machine to provide four advances, thereby lengthening the lock period by ½.

Two chipping rates are supported by selecting either the input clock (10.24 MHZ) or a divide-by-two clock as the basis for the state machine clocks. This selection is made using the "TXRate" and "RxRate" inputs, allowing the receive and transmit sections to use different chipping rates. This selection, as well as the transmit clock, is described in "clkdivid.vhd." The interface to the A/D converter 38 is described in "necad.vhd." The other VHDL modules provide for auxiliary functions such as comparitors, temporary storage and so forth.

It will be appreciated that there have been shown and described preferred embodiments of the invention, and it will be appreciated that various other embodiments, modifications and adaptations of the invention will become readily apparent to those skilled in the art. It is intended that such other obvious adaptations and modifications be incorporated within the scope and spirit of the claims appended hereto.

What is claimed is:

1. A synchronized receiver for a spread-spectrum communications system, said system having a transmitter for generating a data-modulated carrier signal encoded with a predetermined discrete-stepped, cyclical pseudo-random noise code sequence, and a receiver for demodulating and despreading the data-modulated carrier signal, said receiver having a pseudo-random noise code generator, mixer means connected to the pseudo-random noise code generator for mixing the data-modulated carrier signal with a code sequence provided by the pseudo/random noise code generator to despread the carrier signal, and analog indicator means in the receiver for measuring a received signal strength and generating an analog signal; said synchronizer comprising:

clock means providing a phase output corresponding to the phase of the clock timer driving the pseudo-random noise code generator in the transmitter,     analog to digital conversion means for converting the analog signal to a digital signal indicative of the best correlation between the phase of the transmitted modulated carrier signal and the received modulated carrier signal, and     decoding circuitry connected to the clock means and the analog-to-digital conversion means, including means prior to demodulation of the carrier signal for sampling the analog signal received at each of a plurality of discrete steps in the code sequence, means for determining the peak step when the sampled signal reaches its maximum strength during the code sequence and means for aligning the code sequence of the receiver with the code sequence of the transmitter,     wherein the decoding circuitry comprises acquisition state means for determining a peak value in each of the sampled signals during one cycle of the code sequence and for aligning the code sequence of the receiver with the code sequence of the transmitter in response to the peak value, and tracking means for comparing an accumulated peak value over the cycle of the code sequence to a prior accumulated peak value over the cycle of a prior code sequence and shifting the code sequence of the receiver to advance or retard the code sequence of the receiver so as to remain in alignment with the code sequence of the transmitter.

2. The synchronizer of claim 1, wherein the means for aligning comprises means for shifting the code sequence of the receiver by the number of steps in the cycle of the code sequence required for the sampled analog signal to reach its maximum strength.

3. The synchronized receiver of claim 1, wherein the acquisition state means comprises counter means for stepping and sampling means through each step in the cycle of the code sequence.

4. The synchronized receiver of claim 1, wherein the tracking comprises dithering means including means for sampling an average peak value in each step of the cycle of the code sequence, advancing the code sequence of the receiver by one step in a given direction if the newly sampled average peak value is higher than the previous average peak value and changing directions and advancing the code sequence of the receiver by one step in the changed direction if the newly sampled average peak value is less than the previously sampled average peak value.

5. The synchronized receiver of claim 4, wherein the cycle of the code sequences of the receiver is divided into four or more steps.

6. The synchronized receiver of claim 5, wherein the peak value of the analog signal is sampled n times and averaged, and the sequence is then adjusted ¼ of a chip or less.

7. A synchronized receiver for a spread-spectrum communications system, said system having a transmitter for generating a data-modulated carrier signal encoded with a predetermined discrete-stepped, cyclical pseudo-random noise code sequence, and a receiver for demodulating and despreading the data-modulated carrier signal, said receiver having a pseudo-random noise code generator, mixer means connected to the pseudo-random noise code generator for mixing the data-modulated carrier signal with a code sequence provided by the pseudo/random noise code generator to despread the carrier signal, and analog indicator means in the receiver for measuring a received signal strength and generating an analog signal; said synchronizer comprising:

clock means providing a phase output corresponding to the phase of the clock timer driving the pseudo-random noise code generator in the transmitter, analog to digital conversion means for converting the analog signal to a digital signal indicative of the best correlation between the phase of the transmitted modulated carrier signal and the received modulated carrier signal, and decoding circuitry connected to the clock means and the analog-to-digital conversion means, including means prior to demodulation of the carrier signal for sampling the analog signal received at each of a plurality of discrete steps in the code sequence, means for determining the peak step when the sampled signal reaches its maximum strength during the code sequence and means for aligning the code sequence of the receiver with the code sequence of the transmitter, wherein the synchronizer further comprises means for sampling the analog signal at each step in the cycle of the code sequence and means for comparing the sampled analog signal to a previous analog signal sampled during a previous step, and means for saving the sampled analog signal if its strength is greater than a strength of the previous analog signal sampled.

8. A receiver for a spread-spectrum communications system having a transmitter generating a modulated carrier signal encoded with a cyclical pseudo-random code sequence comprising:

a narrow-band receiver for receiving and demodulating narrow band radio frequency modulated carrier signals having an intermediate frequency amplifier which generates an analog output signal corresponding to the signal in the intermediate frequency amplifiers, a pseudo-random code generator having the same cyclical pseudo-random code as that of the transmitter, a mixer for combining the transmitted encoded modulated carrier signal with the pseudo-random code from the code generator to provide a despread modulated carrier signal to the narrow-band receiver, and a locking circuit means connected between the intermediate frequency amplifier and the pseudo-random code generator for shifting the phase of the pseudo-random code from the receiver code generator to align with the pseudo-random code in the transmitted signal in response to the output signal from the amplifier, wherein the locking circuit means senses the peak value of the analog output signal from the amplifier and shifts the phase of the pseudo-random code from the receiver to align with the pseudo-random code from the transmitter, and wherein the locking circuit includes counter means for stepping through the cycle of the code sequence of the receiver, sensing means for determining the number of steps on the cyclical code sequence required for the analog output signal to reach its peak, and shifting means for shifting the code sequence of the receiver by said number of steps to align the code sequence of the receiver with the code sequence of the transmitter.

9. A receiver for a spread-spectrum communications system having a transmitter generating a modulated carrier signal encoded with a cyclical pseudo-random code sequence comprising:

a narrow-band receiver for receiving and demodulating narrow band radio frequency modulated carrier signals having an intermediate frequency amplifier which generates an analog output signal corresponding to the signal in the intermediate frequency amplifier, a pseudo-random code generator having the same cyclical pseudo-random code as that of the transmitter, mixer for combining the transmitted encoded modulated carrier signal with the pseudo-random code from the code generator to provide a despread modulated carrier signal to the narrow-band receiver, and a locking circuit means connected between the intermediate frequency amplifier and the pseudo-random code generator for shifting the phase of the pseudo-random code from the receiver code generator to align with the pseudo-random code in the transmitted signal in response to the output signal from the amplifier, wherein the locking circuit comprises counter means for stepping the locking circuit through the cycle of a receiver code sequence, comparator means for comparing the value of the analog output signal at each step in the code sequence, and shifting means for shifting the receiver code sequence to align it with the transmitter code sequence.

10. The receiver of claim 9, wherein the locking circuit further comprises accumulating means for averaging the peak value of the analog output signal after each partial chip of the code sequence of the receiver, comparing means for comparing an average peak value of the analog output signal for a current cycle of the code sequence of the receiver with the prior average peak value of the analog output signal for the prior cycle of the code sequence of the receiver, storing means for saving the average peak value of the analog output signal in said current cycle of the code sequence if the value of the average peak value of the analog output signal in the current cycle is larger than the prior average peak value, and shifting means for advancing the code sequence of the receiver by one step if the current average peak value is more than the prior average peak value and retarding the code sequence of the receiver by one step if the current average peak value is less than the prior average peak value.

11. A method for synchronizing a receiver of a spread-spectrum communications system, said system having a transmitter for generating a data-modulated carrier signal encoded with a predetermined discrete-stepped, cyclical pseudo-random noise code sequence, and a receiver for demodulating and despreading the data-modulated carrier signal encoded with the predetermined discrete-stepped, cyclical pseudo-random noise code sequence, said receiver having a pseudo-random noise code generator, mixer means connected to the pseudo-random noise code generator for mixing the encoded spread-spectrum modulated carrier signal with the code sequence provided by the pseudo/random noise code generator to despread the carrier signal, and indicator means in the receiver for generating a received signal strength indicator analog signal of the carrier signal; said synchronizing method comprising:

generating a clock output roughly corresponding to the frequency of the clock timer driving the pseudo-random noise code generator in the transmitter, converting the analog signal to a digital signal indicative of the best correlation between the phase of the transmitted modulated carrier signal and the received modulated carrier signal, and despreading the encoded data-modulated carrier signal by the steps of sampling the analog signal received at each of a plurality of discrete steps in the code sequence prior to demodulation of the carrier signal, determining a peak step when the sampled signal reaches its maximum strength during the code sequence and aligning the code sequence of the receiver with the code sequence of the transmitter, wherein the despreading step comprises an acquisition sequence including determining a peak value in each of the sampled signals during one cycle of the coded sequence, and aligning the code sequence of the receiver with the code sequence of the transmitter in response to the peak value, and a tracking sequence including comparing an accumulated peak value over the partial chip periods of the coded sequence to the prior accumulated peak value over the partial chip periods of the prior code sequence and shifting the code sequence to advance or retard the code sequence so as to remain in alignment with the code sequence of the transmitter.

12. A method for synchronizing the receiver of a spread-spectrum communications system, said system having a transmitter for generating a data-modulated carrier signal encoded with a predetermined discrete-stepped, cyclical pseudo-random noise code sequence, and a receiver for demodulating and despreading the encoded spread-spectrum modulated carrier signal, said receiver having a pseudo-random noise code generator, mixer means connected to the pseudo-random noise code generator for mixing the encoded spread-spectrum modulated carrier signal with the code sequence provided by the pseudo/random noise code generator to despread the carrier signal, and indicator means in the receiver for generating a received signal strength indicator analog signal of the carrier signal; said synchronizing method comprising:

generating a clock output roughly corresponding to the frequency of the clock timer driving the pseudo-random noise code generator in the transmitter, converting the analog signal to a digital signal indicative of the best correlation between the phase of the transmitted modulated carrier signal and the received modulated carrier signal, and despreading the encoded data-modulated carrier signal by the steps of sampling the analog signal received at each of a plurality of discrete steps in the code sequence prior to demodulation of the carrier signal, determining the peak step when the sampled signal reaches its maximum strength during the code sequence and aligning the receiver code sequence with the transmitted code sequence, wherein the step of determining comprises sampling the analog signal at each step in the cycle of the code sequence, comparing the sampled analog signal to the previous analog signal sampled during the pervious step, and saving the sampled analog signal if its strength is greater than the strength of the previous sampled analog signal.

* * * * *